United States Patent
Ahn et al.

(10) Patent No.: US 10,749,654 B2
(45) Date of Patent: Aug. 18, 2020

(54) METHOD FOR REPORTING CHANNEL STATE INFORMATION AND DEVICE USING SAME

(71) Applicant: LG ELECTRONICS INC., Seoul (KR)

(72) Inventors: Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 15/572,301

(22) PCT Filed: May 2, 2016

(86) PCT No.: PCT/KR2016/004589
§ 371 (c)(1),
(2) Date: Nov. 7, 2017

(87) PCT Pub. No.: WO2016/182242
PCT Pub. Date: Nov. 17, 2016

(65) Prior Publication Data
US 2018/0123766 A1 May 3, 2018

Related U.S. Application Data

(60) Provisional application No. 62/161,869, filed on May 14, 2015, provisional application No. 62/203,922, (Continued)

(51) Int. Cl.
*H04L 5/00* (2006.01)
*H04B 7/06* (2006.01)
(Continued)

(52) U.S. Cl.
CPC ......... *H04L 5/0057* (2013.01); *H04B 7/0626* (2013.01); *H04L 1/003* (2013.01);
(Continued)

(58) Field of Classification Search
CPC ....... H04L 5/00; H04L 5/0057; H04L 1/1896; H04L 1/0026; H04L 1/003; H04L 1/1861;
(Continued)

(56) References Cited

U.S. PATENT DOCUMENTS

2011/0019637 A1* 1/2011 Ojala .................... H04L 1/0026
370/329
2011/0243066 A1* 10/2011 Nayeb Nazar .......... H04L 1/007
370/328
(Continued)

FOREIGN PATENT DOCUMENTS

CN 102835053 A 12/2012
CN 103959699 A 7/2014
(Continued)

OTHER PUBLICATIONS

Catt, "New PUCCH format(s) for up to 32 CCs", 3GPP TSG RAN WG1 Meeting #80bis, Belgrade, Serbia, Apr. 20-24, 2015, R1-151348, 4 pages.
(Continued)

*Primary Examiner* — Mark H Rinehart
*Assistant Examiner* — Kenneth P Hunt
(74) *Attorney, Agent, or Firm* — Birch, Stewart, Kolasch & Birch, LLP

(57) ABSTRACT

Provided are a method for reporting channel state information (CSI) and a device using the same. The device determines a CSI payload size in a CSI triggering subframe on which a CSI report is triggered. The device selects one of a plurality of physical uplink control channel (PUCCH) formats according to the CSI payload size.

12 Claims, 7 Drawing Sheets

Related U.S. Application Data filed on Aug. 12, 2015, provisional application No. 62/251,122, filed on Nov. 5, 2015.

(51) Int. Cl.

| | | |
|---|---|---|
| *H04L 1/18* | (2006.01) | |
| *H04W 24/10* | (2009.01) | |
| *H04W 72/12* | (2009.01) | |
| *H04L 1/00* | (2006.01) | |
| *H04W 28/06* | (2009.01) | |

(52) U.S. Cl.
CPC .............. *H04L 1/0026* (2013.01); *H04L 1/18* (2013.01); *H04L 1/1861* (2013.01); *H04L 1/1896* (2013.01); *H04L 5/00* (2013.01); *H04W 24/10* (2013.01); *H04W 72/1268* (2013.01); *H04W 28/06* (2013.01)

(58) Field of Classification Search
CPC ................ H04B 7/0626; H04W 24/10; H04W 72/1268; H04W 28/06; H04W 72/0413
See application file for complete search history.

(56) References Cited

U.S. PATENT DOCUMENTS

| | | | |
|---|---|---|---|
| 2013/0121270 A1* | 5/2013 | Chen ....................... H04L 5/001 370/329 |
| 2014/0071928 A1* | 3/2014 | Papasakellariou ... H04B 7/0417 370/329 |
| 2014/0233523 A1 | 8/2014 | Jang et al. |
| 2014/0241295 A1* | 8/2014 | Tang .................... H04L 1/0029 370/329 |
| 2014/0269452 A1* | 9/2014 | Papasakellariou ........................... H04W 72/0406 370/280 |
| 2015/0049655 A1 | 2/2015 | Yang et al. |
| 2017/0006491 A1* | 1/2017 | Chen ....................... H04B 7/024 |
| 2017/0041922 A1* | 2/2017 | Chen ................. H04W 72/1268 |
| 2017/0134117 A1* | 5/2017 | Tan Bergstrom ..... H04L 1/0006 |
| 2017/0171866 A1* | 6/2017 | Cheng .................... H04L 5/0092 |
| 2017/0366380 A1* | 12/2017 | Hwang ................. H04L 5/0055 |
| 2018/0139749 A1* | 5/2018 | Takeda ............. H04W 72/0413 |
| 2018/0184418 A1* | 6/2018 | Takeda .................. H04W 52/32 |
| 2018/0241453 A1* | 8/2018 | Lee ........................ H04L 5/0057 |
| 2018/0263021 A1* | 9/2018 | He ........................ H04L 1/1607 |
| 2018/0310298 A1* | 10/2018 | Li .......................... H04L 1/1671 |
| 2018/0368137 A1* | 12/2018 | Yin ......................... H04L 5/001 |

FOREIGN PATENT DOCUMENTS

| | | |
|---|---|---|
| KR | 10-2012-0081033 A | 7/2012 |
| WO | WO 2015/050743 A1 | 4/2015 |

OTHER PUBLICATIONS

China Unicom, "Considerations on PUCCH Format Enhancements for LTE CA up to 32 CCs", 3GPP TSG RAN WG1 Meeting #80bis, Belgrade, Serbia, Apr. 20-24, 2015, R1-151789, 2 pages.

CMCC, "Discussion on PUCCH design for CA enhancement", 3GPP TSG RAN WG1 Meeting #80bis, Belgrade, Serbia, Apr. 20-24, 2015, R1-152024, 4 pages.

LG Electronics, "Enhancement on Periodic CSI Transmission for Carrier Aggregation," 3GPP TSG RAN WG1 Meeting #68, R1-120842, Dresden, Germany, Feb. 6-10, 2012, XP50563397, 3 pages.

Qualcomm Incorporated, "On the benefits of DAI for CA," 3GPP TSG-RAN WG1 #62, R1-104781, Madrid, Spain, Aug. 23-27, 2010, XP50449979, pp. 1-2.

Huawei et al., "Consideration on working assumptions for eDL-MIMO performance and CSI requirements", 3GPP TSG-RAN WG4 Meeting #57AH, R4-110358, Austin, US, Jan. 17-21, 2011, pp. 1-6.

LG Electronics, "Enhancement on Periodic CSI Transmission for Carrier Aggregation", 3GPP TSG RAN WG1 Meeting #68, R1-120417, Dresden, Germany, Feb. 6-10, 2012, 3 pages.

Texas Instruments, "Aperiodic CSI reporting for carrier aggregation", 3GPP TSG RAN WG1 #63, R1-105892, Jacksonville, FL, USA, Nov. 15-19, 2010, 4 pages.

* cited by examiner

US 10,749,654 B2

METHOD FOR REPORTING CHANNEL STATE INFORMATION AND DEVICE USING SAME

CROSS REFERENCE TO RELATED APPLICATIONS

This application is the National Phase of PCT International Application No. PCT/KR2016/004589, filed on May 2, 2016, which claims priority under 35 U.S.C. 119(e) to U.S. Provisional Application No. 62/161,869, filed on May 14, 2015, U.S. Provisional Application No. 62/203,922, filed on Aug. 12, 2015, and U.S. Provisional Application No. 62/251,122, filed on Nov. 5, 2015, all of which are hereby expressly incorporated by reference into the present application.

BACKGROUND OF THE INVENTION

Field of the Invention

The present invention relates to wireless communication, and more particularly, to a method of reporting channel state information (CSI) in a wireless communication system, and a device using the method.

Related Art

Third generation partnership project (3GPP) long term evolution-advanced (LTE-A) is a technology which satisfies a bandwidth of at most 100 MHz and a data rate of at most 1 Gbps. Carrier aggregation (CA) is one of techniques for increasing a maximum bandwidth by using a plurality of component carriers. One component carrier operates as one serving cell, and as a result, a terminal receives a service from a plurality of serving cells.

With an increase in the number of supported serving cells, an amount of feedback information reported by the terminal is also increased. The feedback information includes channel state information (CSI), HARQ ACK/NACK, or the like.

A physical uplink control channel (PUCCH) is defined for transmission of the feedback information. The existing 3GPP LTE-A provides only three PUCCH formats (i.e., a PUCCH format 1/1a/1b, a PUCCH format 2/2a/2b, a PUCCH format 3) depending on a payload size.

With an increase in the number of serving cells supported in the CA environment, a greater number of PUCCH formats with different payload sizes are required. In addition, how the terminal selects and uses the various PUCCH formats is an issue to be considered.

SUMMARY OF THE INVENTION

The present invention provides a method of reporting channel state information (CSI) in a wireless communication system, and a device using the method.

In an aspect, a method of reporting channel state information (CSI) in a wireless communication system is provided. The method includes receiving, by a wireless device, a configuration for a plurality of physical uplink control channel (PUCCH) formats, determining, by the wireless device, a CSI payload size in a CSI triggering subframe in which a CSI report is triggered, selecting, by the wireless device, one of the plurality of PUCCH formats according to the CSI payload size, and transmitting, by the wireless device, the CSI report through the selected PUCCH format in the CSI triggering subframe.

The CSI report for a plurality of serving cells may be triggered in the CSI triggering subframe, and the CSI payload size may indicate the number of CSI bits for all of the plurality of serving cells.

The PUCCH format selected from the plurality of PUCCH formats may have a smallest maximum payload size greater than the CSI payload size.

In another aspect, a device for reporting channel state information (CSI) in a wireless communication system is provided. The device includes a transceiver configured to transmit and receive a radio signal, and a processor operatively coupled to the transceiver. The processor is configured to control the transceiver to receive configuration for a plurality of physical uplink control channel (PUCCH) formats, determine CSI payload size in a CSI triggering subframe in which a CSI report is triggered, select one of the plurality of PUCCH formats according to the CSI payload size, and control the transceiver to transmit the CSI report through the selected PUCCH format in the CSI triggering subframe.

A technique of transmitting uplink control information is provided when a greater number of serving cells are configured.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE)/LTE-advanced (LTE-A). However, this is for exemplary purposes only, and thus the present invention is also applicable to various wireless communication networks.

The wireless device may be served by a plurality of serving cells. Each serving cell may be defined with a downlink (DL) component carrier (CC) or a pair of a DL CC and an uplink (UL) CC. The plurality of serving cells may be managed by one BS, or may be managed by a plurality of BSs. The plurality of serving cells may be divided into a plurality of cell groups.

The serving cell may be classified into a primary cell (PCell) and a secondary cell (SCell). The PCell operates at a primary frequency, and is a cell designated as the PCell when an initial network entry process is performed or when a network re-entry process starts or in a handover process. The PCell is also called a reference cell. The SCell operates at a secondary frequency. The SCell may be configured after a radio resource control (RRC) connection is established, and may be used to provide an additional radio resource. At least one PCell is configured always. The SCell may be added, modified, or released by using higher-layer signaling (e.g., an RRC message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
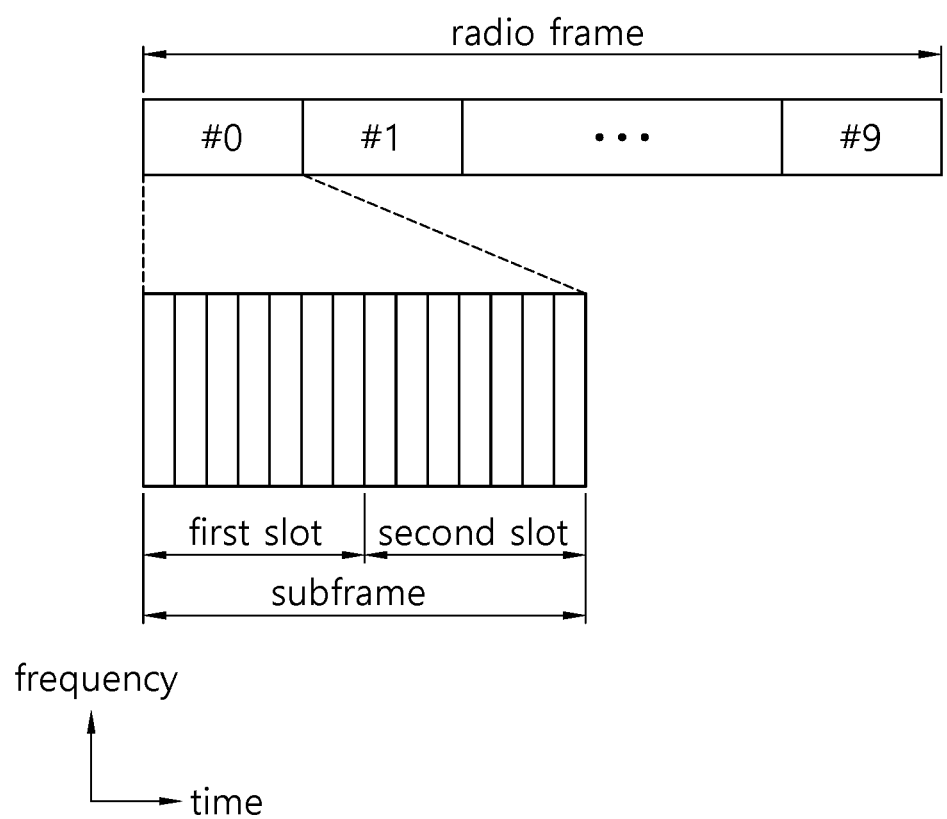
FIG. 1 shows a subframe structure in $3^{rd}$ generation partnership project (3GPP) long term evolution-advanced (LTE-A).

FIG. 1 shows a subframe structure in 3GPP LTE-A.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 14 OFDM symbols for example, the number of OFDM symbols included in one slot may vary depending on a length of a cyclic prefix (CP). According to 3GPP LTE-A, in case of a normal CP, one slot includes 14 OFDM symbols, and in case of an extended CP, one slot includes 12 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB may include 7×12 resource elements (REs).

A physical channel of 3GPP LTE-A may be classified into a downlink (DL) physical channel and an uplink (UL) physical channel. The DL physical channel includes a physical downlink control channel (PDCCH), a physical control format indicator channel (PCFICH), a physical hybrid-ARQ indicator channel (PHICH), and a physical downlink shared channel (PDSCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The UL physical channel includes a physical uplink control channel (PUCCH) and a physical uplink shared channel (PUSCH). The PUCCH is allocated in an RB pair in a subframe. RBs belonging to the RB pair occupy different subcarriers in each of a $1^{st}$ slot and a $2^{nd}$ slot. The PUSCH is allocated by a UL grant on the PDCCH. In a normal CP, a $4^{th}$ OFDM symbol of each slot is used in transmission of a demodulation reference signal (DMRS) for the PUSCH.

Uplink control information (UCI) includes at least any one of HARQ ACK/NACK, channel state information (CSI), and a scheduling request (SR). Hereinafter, as an indicator for indicating a state of a downlink (DL) channel, the CSI may include at least any one of a channel quality indicator (CQI) and a precoding matrix indicator (PMI).

In order to transmit a variety of UCI on a PUCCH, a combination between the UCI and the PUCCH is defined as a PUCCH format as shown in the following table.

TABLE 1

| PUCCH format | UCI to be transmitted |
| --- | --- |
| PUCCH format 1 | Positive SR |
| PUCCH format 1a/1b | 1-bit or 2-bit HARQ ACK/NACK |
| PUCCH format 2 | CSI report |
| PUCCH format 2a/2b | CSI report and 1-bit or 2-bit HARQ ACK/NACK |
| PUCCH format 3 | HARQ ACK/NACK, SR, CSI |

The PUCCH format 1a/1b is used to carry the 1-bit or 2-bit HARQ ACK/NACK by using binary phase shift keying (BPSK) modulation or quadrature phase shift keying (QPSK) modulation.

The PUCCH format 1a/1b is used to carry a CSI report.

The PUCCH format 3 is used to carry encoded UCI of 48 bits. The PUCCH format 3 may carry HARQ ACK/NACK for a plurality of serving cells and a CSI report for one serving cell.

Figure 2:
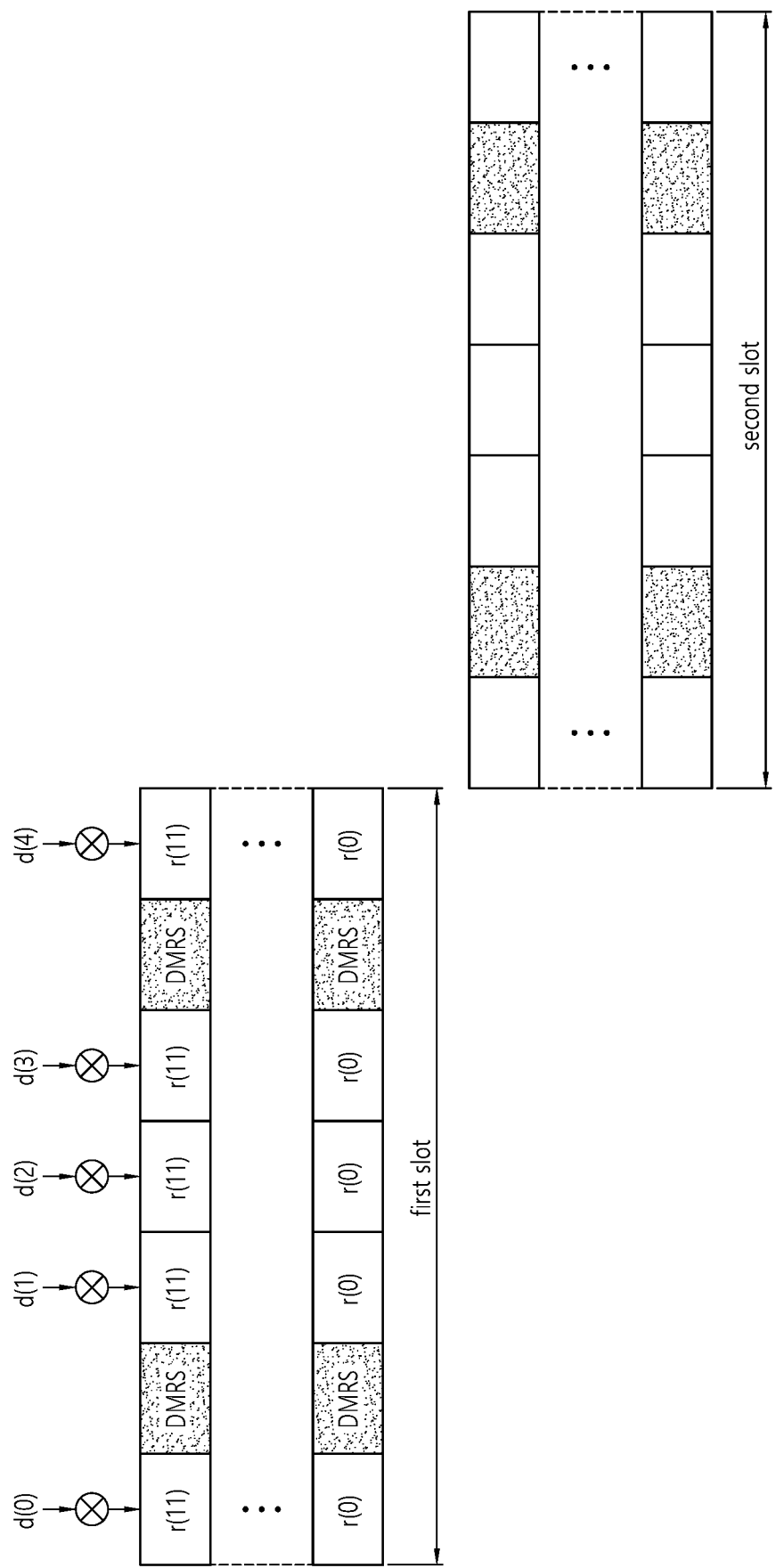
FIG. 2 shows an example of a channel structure for a PUCCH format 2/2a/2b.

FIG. 2 shows an example of a channel structure for a PUCCH format 2/2a/2b.

One slot includes 7 OFDM symbols. $2^{nd}$ and $6^{th}$ OFDM symbols are RS OFDM symbols for DMRS. The remaining 5 OFDM symbols are data OFDM symbols for UCI.

The PUCCH format 2/2a/2b uses only frequency-domain spreading without time-domain spreading. The frequency-domain spreading is achieved by using a frequency-domain sequence R(i)={r(0), r(1), r(2), r(3), r(4), r(5), r(6), r(7), r(8), r(9), r(10), r(11)}. The frequency-domain spreading includes that r(i) corresponds to each subcarrier in a resource block. Although not shown, a frequency-domain sequence in each OFDM symbol may be generated by being cyclically shifted by a cyclic shift vale from a basis sequence. The cyclic shift value may be acquired on the basis of a corresponding OFDM symbol index.

5 data symbols may be transmitted in each slot. Therefore, 10 data symbols d(0) to d(9) may be transmitted in one subframe. When using QPSK, the PUCCH format 2/2a/2b may carry 20 encoded bits. That is, the PUCCH format 2a can carry 20 bits of CSI.

Figure 3:
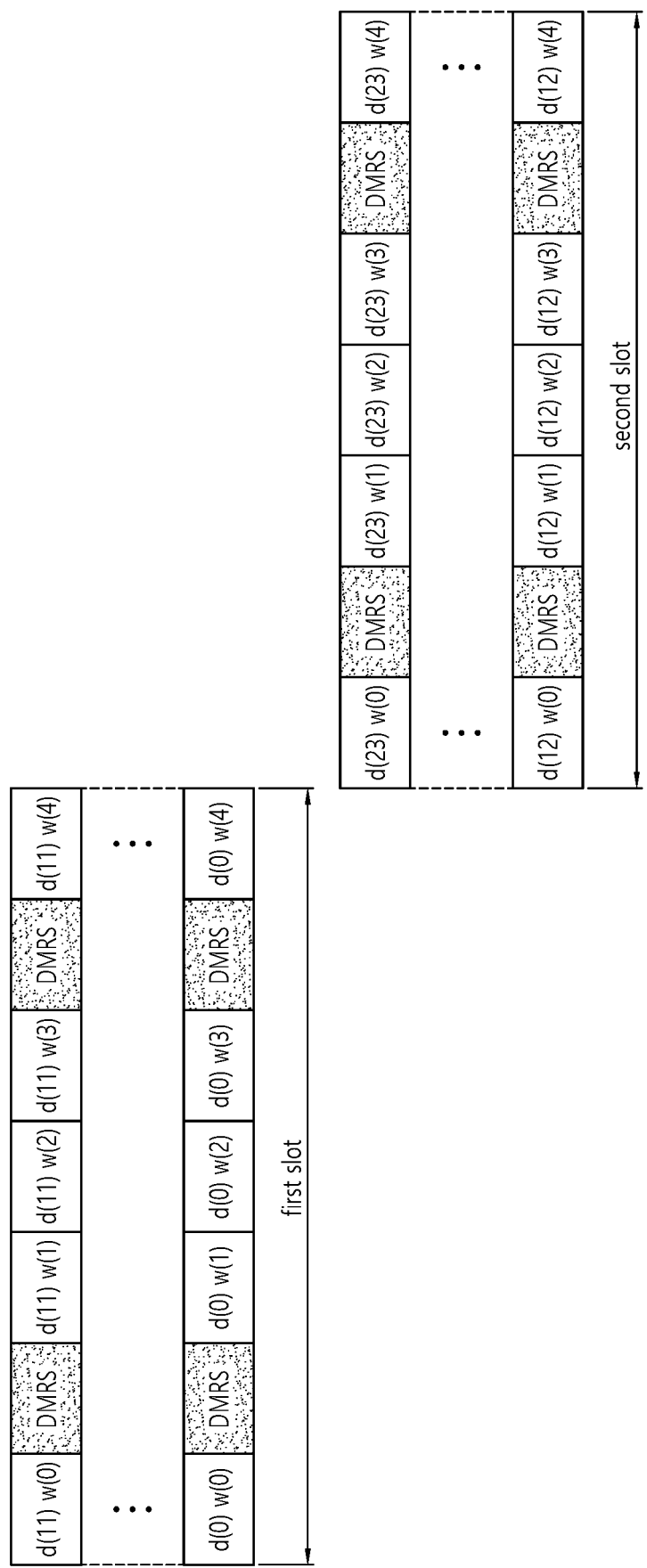
FIG. 3 shows an example of a channel structure for a PUCCH format 3.

FIG. 3 shows an example of a channel structure for a PUCCH format 3.

One slot includes 7 OFDM symbols. $2^{nd}$ and $6^{th}$ OFDM symbols are RS OFDM symbols for DMRS. The remaining 5 OFDM symbols are data OFDM symbols for UCI.

The PUCCH format 3 may carry 24 data symbols d(0) to d(23). When using QPSK, the PUCCH format 3 may carry 48 encoded bits.

In a first slot, first 12 data symbols d(0) to d(11) are spread in a time domain by using an orthogonal code W(j)={w(0), w(1), w(2), w(3), w(4)}. The time-domain spreading includes that w(i) corresponds to each OFDM symbol in a slot. In a second slot, second 12 data symbols d(12) to d(23) are spread in the time domain by using the orthogonal code W(j).

A time/frequency/code resource used in PUCCH transmission is called a PUCCH resource. For example, an orthogonal code index, a cyclic shift index, and a resource block index are required for the PUCCH format 1/1a/1b. A cyclic shift index and a resource block index are required for the PUCCH format 2/2a/2b. An orthogonal code index and a resource block index are required for the PUCCH format 2/2a/2b. A resource index is a parameter used to determine a corresponding PUCCH resource.

Hereinafter, a proposed CSI report is disclosed.

A CSI report may be classified into an aperiodic CSI report and a periodic CSI report. In the aperiodic CSI report, a wireless device reports CSI when an BS requests. In the periodic CSI report, a wireless device reports CSI on a period configured by an BS.

Multiple CSI reporting mode can be provided since a wireless device may support various transmission modes such as single antenna transmission, multiple antenna transmission, etc. The following table shows an example of reporting modes for periodic CSI report.

TABLE 2

|  | PMI Feedback Type | |
| --- | --- | --- |
|  | No PMI | single PMI |
| wideband CQI | Mode 1-0 | Mode 1-1 |
| subband CQI | Mode 2-0 | Mode 2-1 |

One or more reporting modes can be configured to the wireless device.

Along with the reporting modes, a reporting type can be defined as shown below.

TABLE 3

| Reporting Type | Contents |
| --- | --- |
| Type 1 | subband CQI |
| Type 1a | subband CQI and second PMI |
| Type 2/2b/2c | wideband CQI and PMI |
| Type 2a | wideband PMI |
| Type 3 | RI |
| Type 4 | wideband CQI |
| Type 5 | RI and wideband PMI |
| Type 6 | RI and PTI |

A reporting mode can be used to define which CSI report is used. Information included in the CSI is determined according to the reporting type. CSI may include at least one of contents as below.

rank indicator (RI)
subband CQI: CQI corresponding to one or more subbands among S subbands, where S>1. A size of a subband may vary according to a size of system band.
wideband CQI: CQI corresponding to S subbands.
wideband PMI: PMI corresponding to S subbands
precoding type indicator (PTI): a type for the PMI Accordingly, a payload size of the CSI for the periodic CSI report may vary at each subframe in accordance with a transmission state and a reporting type.

As described above, CSI for a single serving can be reported through the conventional PUCCH format 3.

When a plurality of serving cells are configured to the wireless device, it is efficient to report CSI for the plurality of serving cells through a single PUCCH. However, this requires to design a PUCCH format for the increased CSI payload.

A plurality of periodic CSI reports can independently be configured for a plurality of serving cells. A CSI payload size in a specific subframe may vary according to a CSI configuration of each serving cell and a number of serving cells. An aperiodic CSI is also triggered in the specific subframe.

It is proposed to report CSI providing various CSI payload size.

First, a channel structure of a PUCCH format for the increased CSI payload is described.

For convenience, the PUCCH format for UCI transmission is defined as follows.

1) PUCCHy: A PUCCH format for CSI report in which a single serving cell is configured or a CSI payload size has at most M bits (M>2) (e.g., PUCCH format 2/2a/2b or a PUCCH format 3)

2) PUCCHz: A PUCCH format for CSI report in which a plurality of serving cells are configured or a CSI payload size exceeds M bits. This is referred to as an extended PUCCH format.

Figure 4:
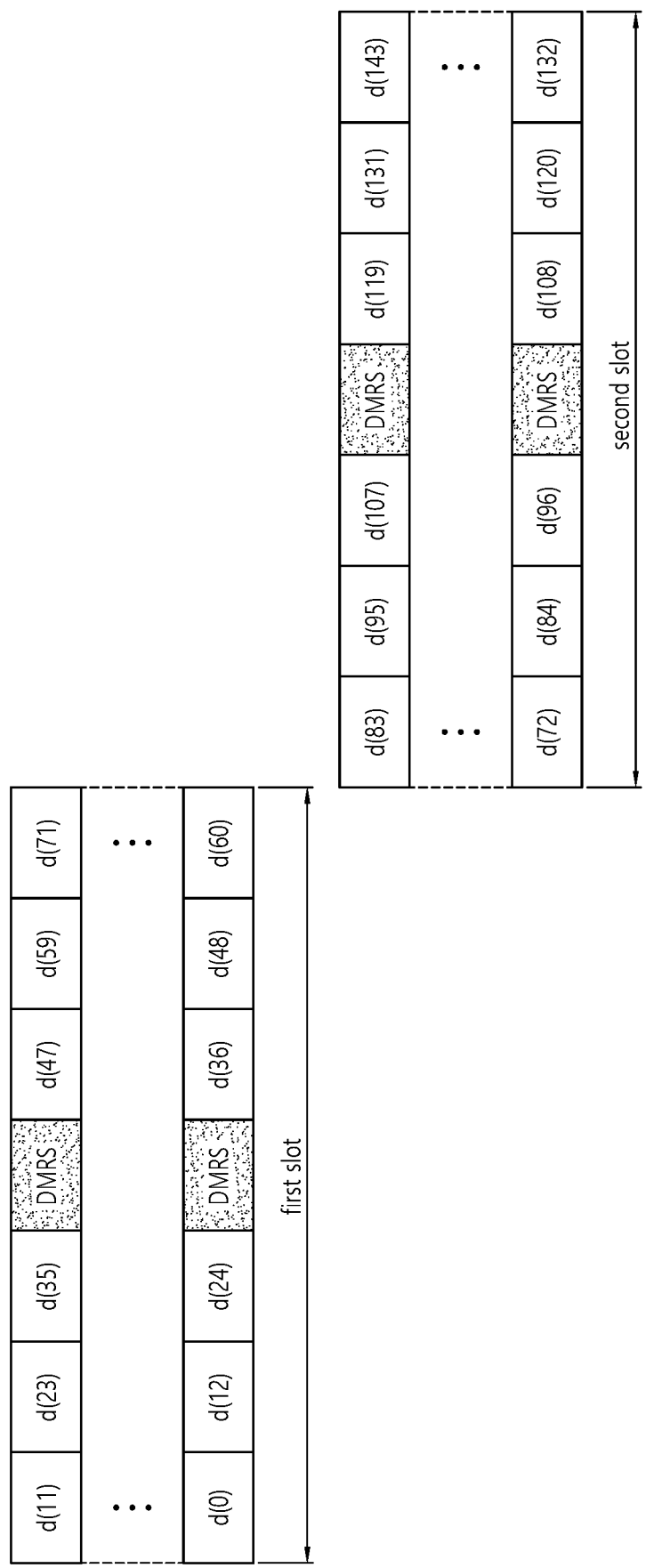
FIG. 4 shows an example of a channel structure for an extended PUCCH format.

FIG. 4 shows an example of a channel structure for an extended PUCCH format.

One slot includes 7 OFDM symbols. An OFDM symbol in the middle (i.e., a $4^{th}$ OFDM symbol) is an RS OFDM symbol for DMRS. The remaining 6 OFDM symbols are data OFDM symbols for UCI. If one slot includes 6 OFDM symbols, a $3^{rd}$ OFDM symbol is an RS OFDM symbol, and the remaining 5 OFDM symbols are data OFDM symbols.

The extended PUCCH format does not use frequency-domain spreading and time-domain spreading. When one resource is allocated to the extended PUCCH format, 12 data symbols may be transmitted for each OFDM symbol. Therefore, 144 data symbols d(0) to d(143) may be transmitted in one subframe. When using QPSK, the extended PUCCH format may carry 288 encoded bits.

Figure 5:
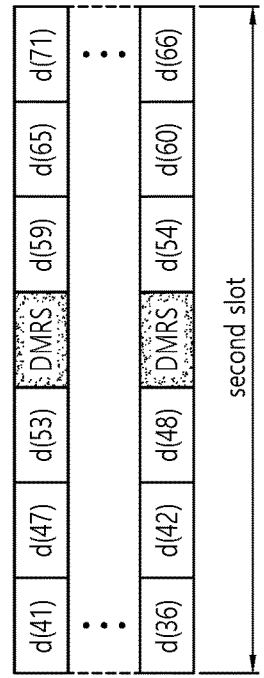
FIG. 5 shows another example of a channel structure for an extended PUCCH format.
Figure 5:
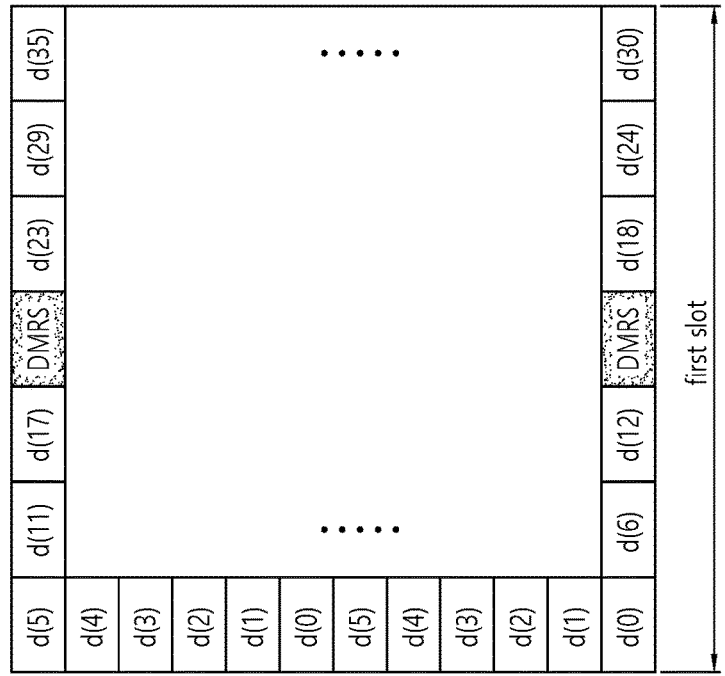

FIG. 5 shows another example of a channel structure for an extended PUCCH format.

In comparison with the channel structure of FIG. 4, 6 data symbols are repeated in one resource block for each OFDM symbol. For example, {d(0), d(1), d(2), d(3), d(4), d(5), d(0), d(1), d(2), d(3), d(4), d(5)} is transmitted in a first OFDM symbol. Accordingly, although 144 data symbols can be transmitted in the channel structure of FIG. 4, 72 data symbols d(0) to d(71) may be transmitted in this channel structure. When using QPSK, the extended PUCCH format may carry 144 encoded bits.

In order to support multi-user multiplexing, code division multiplexing (CDM) may be supported in a data symbol repeated in each OFDM symbol. For example, {+d(0), +d(1), +d(2), +d(3), +d(4), +d(5), +d(0), +d(1), +d(2), +d(3), +d(4), d(5)} may be transmitted through CDM 0, and {+d(0), +d(1), +d(2), +d(3), +d(4), +d(5), −d(0), −d(1), −d(2), −d(3), −d(4), −d(5)} may be transmitted through CDM 1. A cyclic shift value used in DMRS may vary depending on the CDM.

For convenience, the channel structure of FIG. 4 is denoted by PUCCHz1, the channel structure of FIG. 5 is denoted by PUCCHz2, and these channels are collectively denoted by PUCCHz.

A plurality of resource blocks may be allocated to the PUCCHz. That is, only one resource block may be allocated to the existing PUCCHx/y, whereas one or more resource blocks may be allocated to the PUCCHz. This means that a bandwidth at which the PUCCHz is transmitted is the same as or greater than a bandwidth at which the PUCCHx/y is transmitted.

A BS may inform each wireless device of an indication regarding whether to use the PUCCHz1 or the PUCCHz2. Each wireless device may confirm whether to use a corresponding PUCCH format through a resource configuration of the PUCCHz1 or a resource configuration of the PUCCHz2. The BS may instruct to use both the PUCCHz1 and the PUCCHz2. The wireless device may select one of the PUCCHz1 and the PUCCHz2 according to a criterion for selecting a PUCCH format described below.

Similarly to the configuration of the PUCCH format 3, in the resource configuration for the PUCCHz, a plurality of candidate resources may be configured in advance through an RRC message, and one of the plurality of candidate resources may be designated through a DL grant.

Now, a criterion for selecting a PUCCH format used in CSI transmission from a plurality of PUCCH formats is described. Although it is described hereinafter that one of the PUCCHy and the PUCCHz is selected for example, it is also possible to select one of the PUCCHx and the PUCCHz or to select one of the PUCCHx, the PUCCHy, and the PUCCHz.

A plurality of selectable PUCCH formats may include a plurality of PUCCH formats having different resource blocks. Alternatively, the plurality of selectable PUCCH formats may include a plurality of PUCCH formats having different bandwidths. For example, one of a first PUCCHz having one resource block and a second PUCCHz having two resource blocks may be selected.

Figure 6:
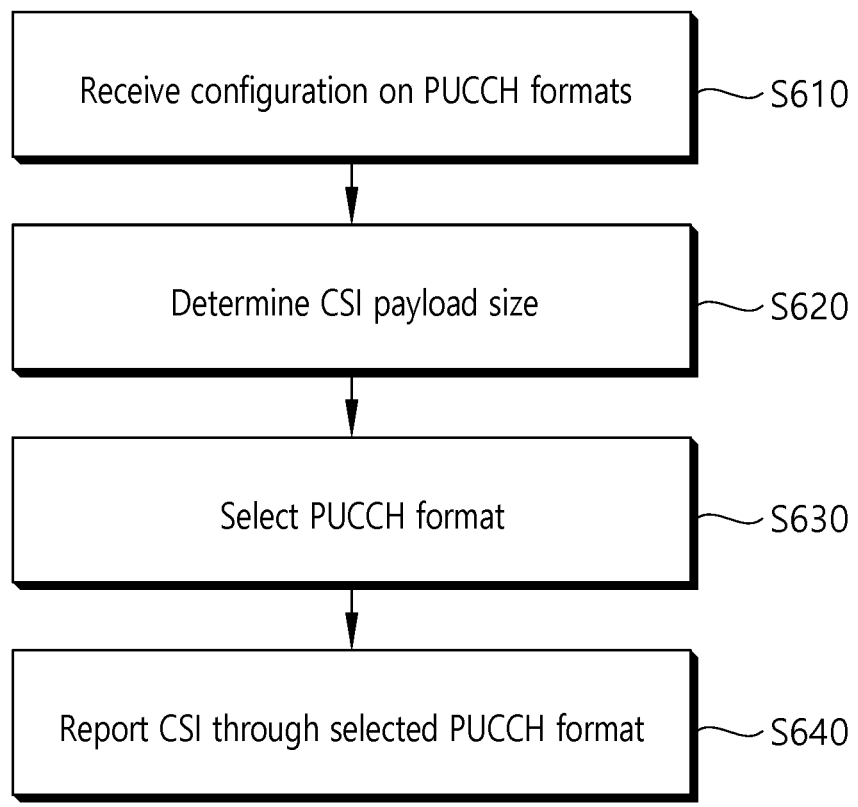
FIG. 6 is a flowchart showing a channel state information (CSI) report according to an embodiment of the present invention.

FIG. 6 is a flowchart showing a CSI report according to an embodiment of the present invention.

It is assumed that at least one serving cell is configured to a wireless device, and a configuration for a CSI report corresponding to each of at least one serving cell is defined. The CSI report configuration may include a configuration for a periodic CSI report in a corresponding serving cell.

In step S610, the wireless device receives a configuration for a plurality of PUCCH formats. For example, four PUCCH formats are configured as follows. A maximum payload size is determined by assuming QPSK modulation, and the number of PUCCH formats or the number of allocated resource blocks is for exemplary purposes only.

TABLE 4

| No. | PUCCH format | The number of allocated resource blocks | Maximum payload size |
|---|---|---|---|
| 1 | PUCCHy | 1 | 20 bits |
| 2 | PUCCHz2 | 1 | 144 bits |
| 3 | PUCCHz1 | 1 | 288 bits |
| 4 | PUCCHz1 | 2 | 576 bits |

In step S620, if the periodic CSI report is triggered in a specific subframe (this is called a CSI triggering subframe), the wireless device determines a CSI payload size for the CSI report.

If the CSI report for the plurality of serving cells is triggered in the CSI triggering subframe, the CSI payload size may indicate the number of CSI bits for all of the plurality of serving cells.

In step S630, the wireless device selects a PUCCH format according to the CSI payload size.

If the CSI report for only one serving cell is triggered in the CSI triggering subframe, the existing PUCCH format may be utilized, and thus the wireless device may select PUCCHy.

If the CSI report for the plurality of serving cells is triggered in the CSI triggering subframe, the wireless device may select a PUCCH format having a smallest maximum payload size greater than the CSI payload size among the configured plurality of PUCCH formats. For example, if the CSI payload size is 150 bits, the PUCCH format #3 of Table 4 may be selected.

In step S640, the wireless device reports CSI through the selected PUCCH format.

The PUCCH format and/or the PUCCH resource may be selected according to the CSI payload size and/or the number of cells requiring the CSI report in the CSI triggering subframe.

The following method may be applied under the assumption that the CSI payload size is Ncsi and a maximum size capable of transmitting CSI through a PUCCH format i is Mcsi(i).

In one embodiment, a PUCCH format having a smallest value Mcsi(i) satisfying Ncsi <=Mcsi(i) is selected. If there is no PUCCH format satisfying Ncsi<=Mcsi(i), a PUCCH format having a greatest Mcsi(i) value is selected. If Ncsi>Mcsi(i), transmission of a CSI report for some cells may be discarded among CSI for a plurality of serving cells. If Ncsi>Mcsi(i), transmission of a CSI report for some cells may be discarded according to a priority among a plurality of serving cells. For example, the smaller the index of the serving cell, the higher the priority.

A plurality of resource blocks may be allocated for the aforementioned extended PUCCH format. Since a maximum payload size differs depending on the number of allocated resource blocks, the PUCCH format may be determined by comparing the CSI payload size with the number of allocated resource blocks. It may be said that the PUCCH resource is determined according to the CSI payload size. For example, it is assumed that two resources N1 and N2 are defined in PUCCHz1. N1 and N2 are the number of allocated resource blocks. The wireless device may determine a smallest value satisfying the CSI payload size from N1 and N2 as a resource of PUCCHz1.

In another embodiment, a PUCCH format for transmitting CSI may be predetermined according to Ncsi. This may be given by RRC signaling. If Ncsi>Mcsi(i), transmission of a CSI report for some cells may be discarded among CSI for a plurality of serving cells.

Figure 7:
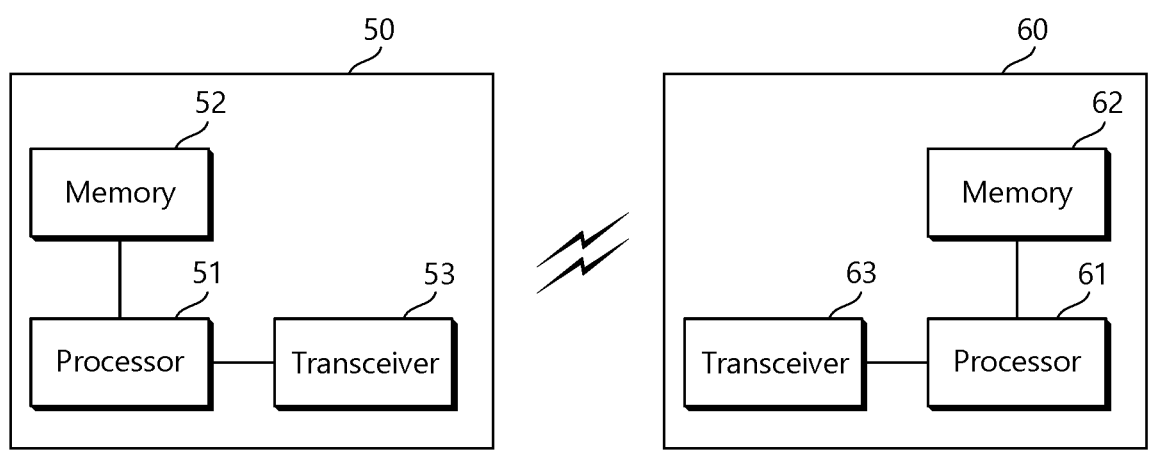
FIG. 7 is a block diagram showing a wireless communication system according to an embodiment of the present invention.

FIG. 7 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, a CSI report of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting channel state infatuation (CSI) in a wireless communication system, the method comprising:
   receiving, by a wireless device, a configuration for a first physical uplink control channel (PUCCH) format and a second PUCCH format, the configuration including information regarding a first number of resource blocks (RBs) allocated to the second PUCCH format and a second number of RBs allocated to the second PUCCH format, the first number of RBs being smaller than the second number of RBs;
   determining, by the wireless device, a payload size of at least one periodic CSI in a CSI triggering subframe in which the at least one periodic CSI is to be transmitted;
   selecting, by the wireless device, one of the first PUCCH format and the second PUCCH format based on the payload size of the at least one periodic CSI report and a number of serving cells related to the at least one periodic CSI report; and
   transmitting, by the wireless device, the at least one periodic CSI report through the selected PUCCH format in the CSI triggering subframe.

2. The method of claim 1, wherein the CSI triggering subframe includes a plurality of orthogonal frequency division multiplexing (OFDM) symbols, and
   wherein the second PUCCH format uses two OFDM symbols for a demodulation reference signal (DM RS) among the plurality of OFDM symbols in the CSI triggering subframe.

3. The method of claim 2, wherein the two OFDM symbols for the DM RS are a fourth OFDM symbol and an eleventh OFDM symbol of the plurality of OFDM symbols in the CSI triggering subframe.

4. The method of claim 1, wherein the payload size of the second PUCCH format increases as the number of RBs allocated to the second PUCCH format increases.

5. The method of claim 1, wherein one RB includes 12 subcarriers.

6. A device for reporting channel state information (CSI) in a wireless communication system, the device comprising:
   a transceiver configured to transmit and receive a radio signal; and
   a processor operatively coupled to the transceiver and configured to:
   control the transceiver to receive a configuration for a first physical uplink control channel (PUCCH) format and a second PUCCH format, the configuration including information regarding a first number of resource blocks (RBs) allocated to the second PUCCH format and a second number of RBs allocated to the second PUCCH format, the first number of RBs being smaller than the second number of RBs;
   determine a payload size of at least one periodic CSI report in a CSI triggering subframe in which the at least one periodic CSI report is to be transmitted;
   select one of the first PUCCH format and the second PUCCH format based on the payload size of the at least one periodic CSI report and a number of serving cells related to the at least one periodic CSI report; and
   control the transceiver to transmit the at least one periodic CSI report through the selected PUCCH format in the CSI triggering subframe.

7. The device of claim 6, wherein the CSI triggering subframe includes a plurality of orthogonal frequency division multiplexing (OFDM) symbols, and
   wherein the second PUCCH format uses two OFDM symbols for a demodulation reference signal (DM RS) among the plurality of OFDM symbols in the CSI triggering subframe.

8. The device of claim 7, wherein the two OFDM symbols for the DM RS are a fourth OFDM symbol and an eleventh OFDM symbol of the plurality of OFDM symbols in the CSI triggering subframe.

9. The device of claim 6, wherein the payload size of the second PUCCH format increases as the number of RBs allocated to the extended PUCCH format increases.

10. The device of claim 6, wherein one RB includes 12 subcarriers.

11. The method of claim 1, wherein:
    if there is only one periodic CSI report for one serving cell, the first PUCCH format is selected,
    if there are periodic CSI reports for more than one serving cell and the payload size of the periodic CSI reports is equal to or less than the payload size of the second PUCCH format with the first number of RBs, the second PUCCH format with the first number of RBs is selected, and if there are periodic CSI reports for more than one serving cell and the payload size of the periodic CSI reports is greater than the payload size of the second PUCCH format with the first number of RBs, the second PUCCH format with the second number of RBs is selected.

12. The device of claim 6, wherein:

if there is only one periodic CSI report for one serving cell, the first PUCCH format is selected, if there are periodic CSI reports for more than one serving cell and the payload size of the periodic CSI reports is equal to or less than the payload size of the second PUCCH format with the first number of RBs, the second PUCCH format with the first number of RBs is selected, and if there are periodic CSI reports for more than one serving cell and the payload size of the periodic CSI reports is greater than the payload size of the second PUCCH format with the first number of RBs, the second PUCCH format with the second number of RBs is selected.

\* \* \* \* \*